United States Patent
Gai et al.

(10) Patent No.: US 9,516,541 B2
(45) Date of Patent: Dec. 6, 2016

(54) CONGESTION MEASUREMENT AND REPORTING FOR REAL-TIME DELAY-SENSITIVE APPLICATIONS

(71) Applicant: Intel IP Corporation, Santa Clara, CA (US)

(72) Inventors: Yi Gai, Hillsboro, OR (US); Jing Zhu, Portland, OR (US); Rath Vannithamby, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 231 days.

(21) Appl. No.: 14/314,850

(22) Filed: Jun. 25, 2014

(65) Prior Publication Data

US 2015/0078171 A1   Mar. 19, 2015

Related U.S. Application Data

(60) Provisional application No. 61/879,014, filed on Sep. 17, 2013.

(51) Int. Cl.
*H04L 1/00* (2006.01)
*H04W 28/02* (2009.01)
(Continued)

(52) U.S. Cl.
CPC ........ *H04W 28/0242* (2013.01); *G01S 5/0236* (2013.01); *H04J 3/02* (2013.01); *H04L 5/003* (2013.01); *H04L 5/0048* (2013.01); *H04W 4/14* (2013.01); *H04W 24/10* (2013.01); *H04W 28/0236* (2013.01); *H04W 28/0247* (2013.01); *H04W 28/0268* (2013.01);
(Continued)

(58) Field of Classification Search
CPC ................................. H04W 28/0236
USPC ....................................... 370/237
See application file for complete search history.

(56) References Cited

U.S. PATENT DOCUMENTS

2009/0232001 A1* 9/2009 Gong ............... H04L 47/10
370/236
2012/0213072 A1   8/2012 Kotecha et al.
(Continued)

FOREIGN PATENT DOCUMENTS

KR   1020100114921 A   10/2010
WO   WO-2013123467 A1   8/2013
(Continued)

OTHER PUBLICATIONS

"International Application Serial No. PCT/US2014/056035, International Search Report mailed Dec. 24, 2014", 4 pgs.
(Continued)

*Primary Examiner* — Shripal Khajuria
(74) *Attorney, Agent, or Firm* — Schwegman Lundberg & Woessner, P.A.

(57) ABSTRACT

Embodiments describe mechanisms for an eNB, possibly assisted by a UE, to detect and possibly alleviate user plane congestion. In some embodiments, the eNB implements UE assisted packet dropping, where the UE requests the eNB drop packets in a sub-QCI that meet designated criteria, such as exceeding a sub-QCI delay threshold. Other embodiments, detect periods of congestion and send congestion indication to the core network when the congestion period exceeds a threshold or when the user experience is degraded. Some embodiments implement both sets of functionality.

14 Claims, 7 Drawing Sheets

(51) Int. Cl.
| | |
|---|---|
| *H04W 36/04* | (2009.01) |
| *H04W 64/00* | (2009.01) |
| *H04W 4/14* | (2009.01) |
| *H04L 5/00* | (2006.01) |
| *H04W 24/10* | (2009.01) |
| *H04W 36/00* | (2009.01) |
| *G01S 5/02* | (2010.01) |
| *H04J 3/02* | (2006.01) |
| *H04W 76/04* | (2009.01) |
| *H04W 72/04* | (2009.01) |
| *H04W 28/12* | (2009.01) |

(52) U.S. Cl.
CPC ....... *H04W 36/0083* (2013.01); *H04W 36/04* (2013.01); *H04W 64/00* (2013.01); *H04W 72/0446* (2013.01); *H04W 76/048* (2013.01); *H04W 28/12* (2013.01)

(56) References Cited

U.S. PATENT DOCUMENTS

2012/0327779 A1\* 12/2012 Gell .................. H04L 47/6275
370/238
2013/0242887 A1 9/2013 Zhu et al.

FOREIGN PATENT DOCUMENTS

| WO | WO-2013127665 A1 | 9/2013 |
| WO | WO-2015042117 A1 | 3/2015 |

OTHER PUBLICATIONS

"International Application Serial No. PCT/US2014/056035, Written Opinion mailed Dec. 24, 2014", 7 pgs.

\* cited by examiner

CONGESTION MEASUREMENT AND REPORTING FOR REAL-TIME DELAY-SENSITIVE APPLICATIONS

PRIORITY CLAIM

This application claims the benefit of priority under 35 U.S.C. 119(e) to U.S. Provisional Patent Application Ser. No. 61/879,014, filed Sep. 17, 2013, which is incorporated herein by reference in its entirety.

TECHNICAL FIELD

Embodiments pertain to wireless communications. More particularly, some embodiments relate to measurement and reporting of Radio Access Network (RAN) downlink congestion at an enhanced Node B (eNB).

BACKGROUND

An end-to-end class-based Quality of Service (QoS) architecture has been defined for LTE (Long Term Evolution). This QoS architecture allows devices, such as an eNB to prioritize traffic to give better user experiences for programs that rely on time-sensitive delivery of data. However, as the demand for data carried over LTE or other wireless networks increases, congestion can increase and affect the ability to provide appropriate QoS. As congestion increases, techniques to measure and report congestion are becoming more important.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order to not obscure the description of the embodiments with extraneous detail. Thus, the present disclosure is not intended to be limited to the embodiments shown, but is to be accorded the widest scope consistent with the principles and features disclosed herein.

Figure 1:
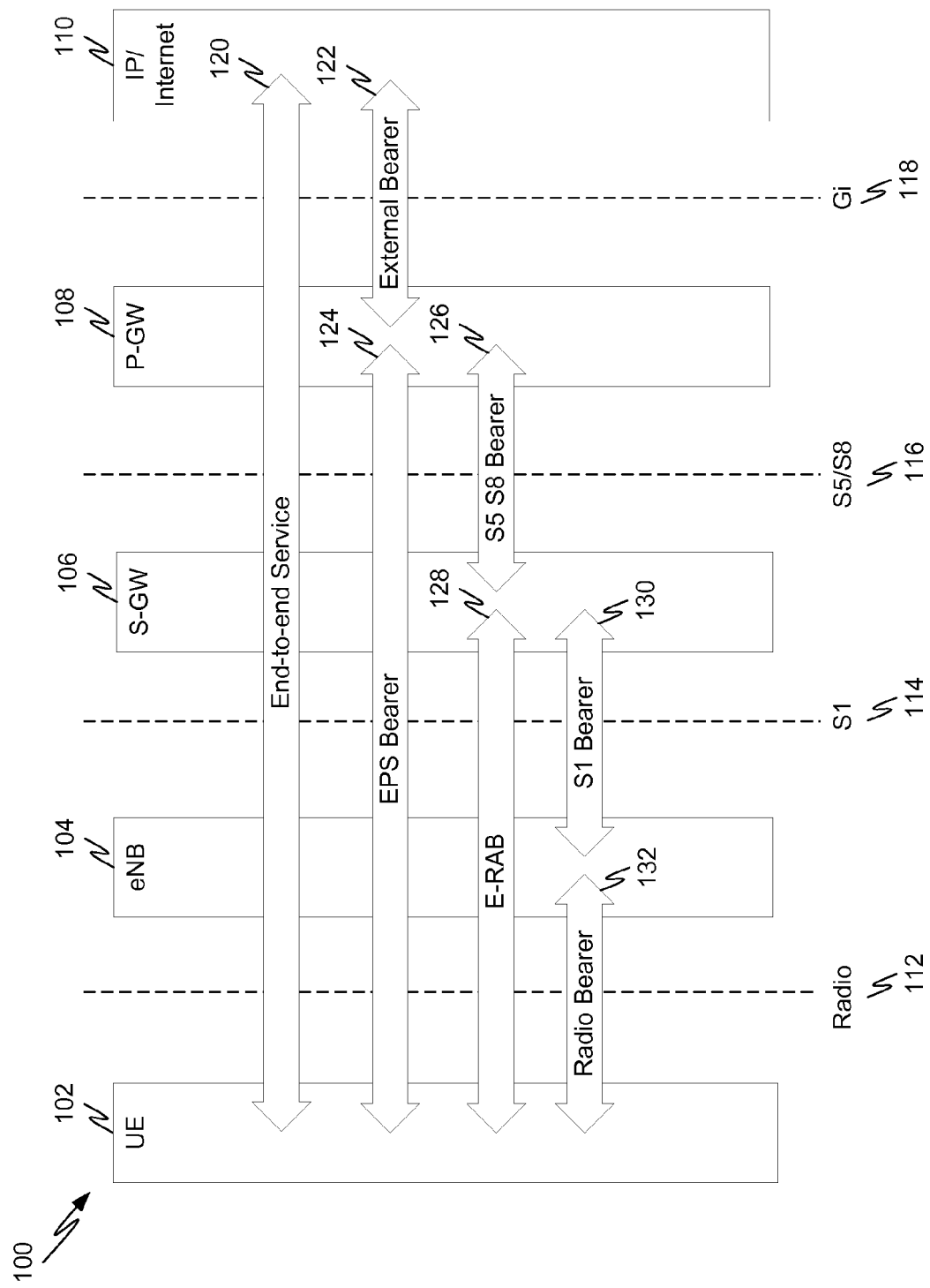
FIG. 1 illustrates an example architecture showing bearers to transfer data between a core network, eNB and UE.

An end-to-end, class-based Quality of Service (QoS) architecture has been defined for Long Term Evolution (LTE) networks. This mechanism shown generally as 100 in FIG. 1 is based on the concept of data flows and bearers. End-to-end service 120 can be provided from UE 102 to the internet or other IP network 110 using data flows and bearers. Data flows are mapped to bearers. FIG. 1 illustrates a variety of bearers, and illustrates how multiple bearers are combined to provide end-to-end service 120. For example, an external bearer 122 can be combined with the EPS bearer 124. The EPS bearer, in turn, is comprised of the radio bearer 132, the S1 bearer 130 and the S5/S8 bearer 126. These three bearers (the radio bearer 132, the S1 bearer 130 and the S5/S8 bearer 126) combine to provide the end-to-end QoS support through the Evolved Universal Mobile Telecommunications System Terrestrial Radio Access Network (E-UTRAN) comprising the UE 102 and eNB 104 and the Evolved Packet Core (EPC) (or more simply the core network) via the EPS Bearer 124.

At the EPS Bearer level, QoS Class Identifier (QCI) is used to specify the QoS parameters of each class, including priority, packet delay budget, packet error/loss rate, and resource type. In the 3GPP LTE Technical Specification 23.203 version 12.4.0, there are nine classes mapped to nine QCIs, each with designated priority, packet delay, packet error loss rate and so forth. The QCI "9" is also called the default bearer for non-privileged subscribers. QCI 9 holds the lowest priority does not define a packet delay budget or packet error loss rate.

With proliferation of portable Internet devices, such as Smartphones, Tablets, Ultrabooks, and other devices, a non-privileged subscriber can easily download third party applications from on-line appstores and use them over the network. Typically, data packets generated by these applications are delivered Over-the-Top (OTT) using the default bearer. Often times, the mobile operators may not even be aware of the contents in these packets due to strong encryption.

Some real-time applications, such as Skype, FaceTime, GoogleTalk, and others have different QoS requirements in terms of delay and throughput, than other non Real-Time apps, such as web-browsing. Thus, how to support QoS for these OTT applications efficiently, especially in a congested environment, to improve user experience in today's and future mobile network is still a problem. This disclosure describes mechanisms for detection and resolution of congested situations.

Figure 2:
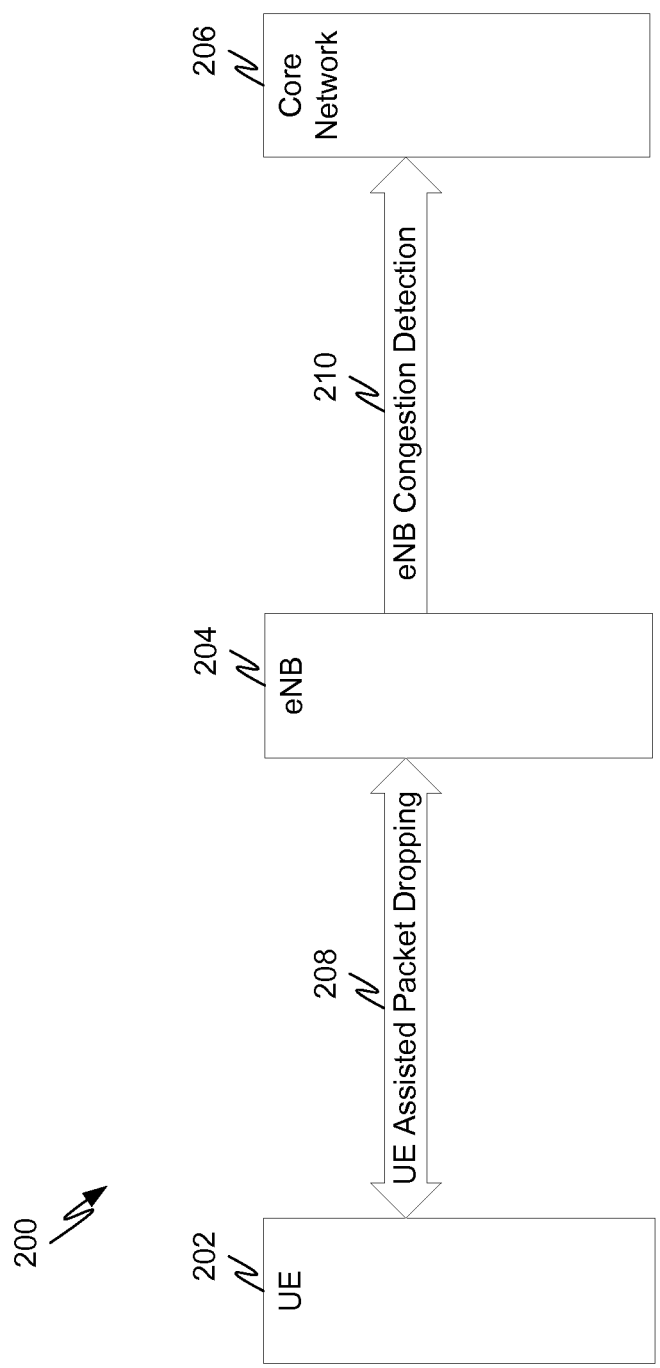
FIG. 2 illustrates communications between UE and an eNB for UE assisted packet dropping and communications between an eNB and the core network reporting congestion.

FIG. 2 illustrates communications 200 between UE 202 and an eNB 204 for UE assisted packet dropping and communications between an eNB 204 and the core network 206 in order to report congestion. In order to relieve congestion, lower priority packets can be dropped allowing higher priority packets to move more expeditiously through the network. Involving the UE 202 in helping the eNB 204 prioritize packets and identifying which to drop (e.g., 208), results in a better user experience as the UE is sometimes in the best position to know which packets should be given priority over other packets.

Alternatively, or additionally, when the eNB 204 detects congestion, it can report the congestion (e.g., 210) to the core network (e.g., Serving Gateway (S-GW) and Packet Data Network Gateway (P-GW)). This allows the core network to make decisions that can help alleviate congestion at the eNB 204.

Figure 3:
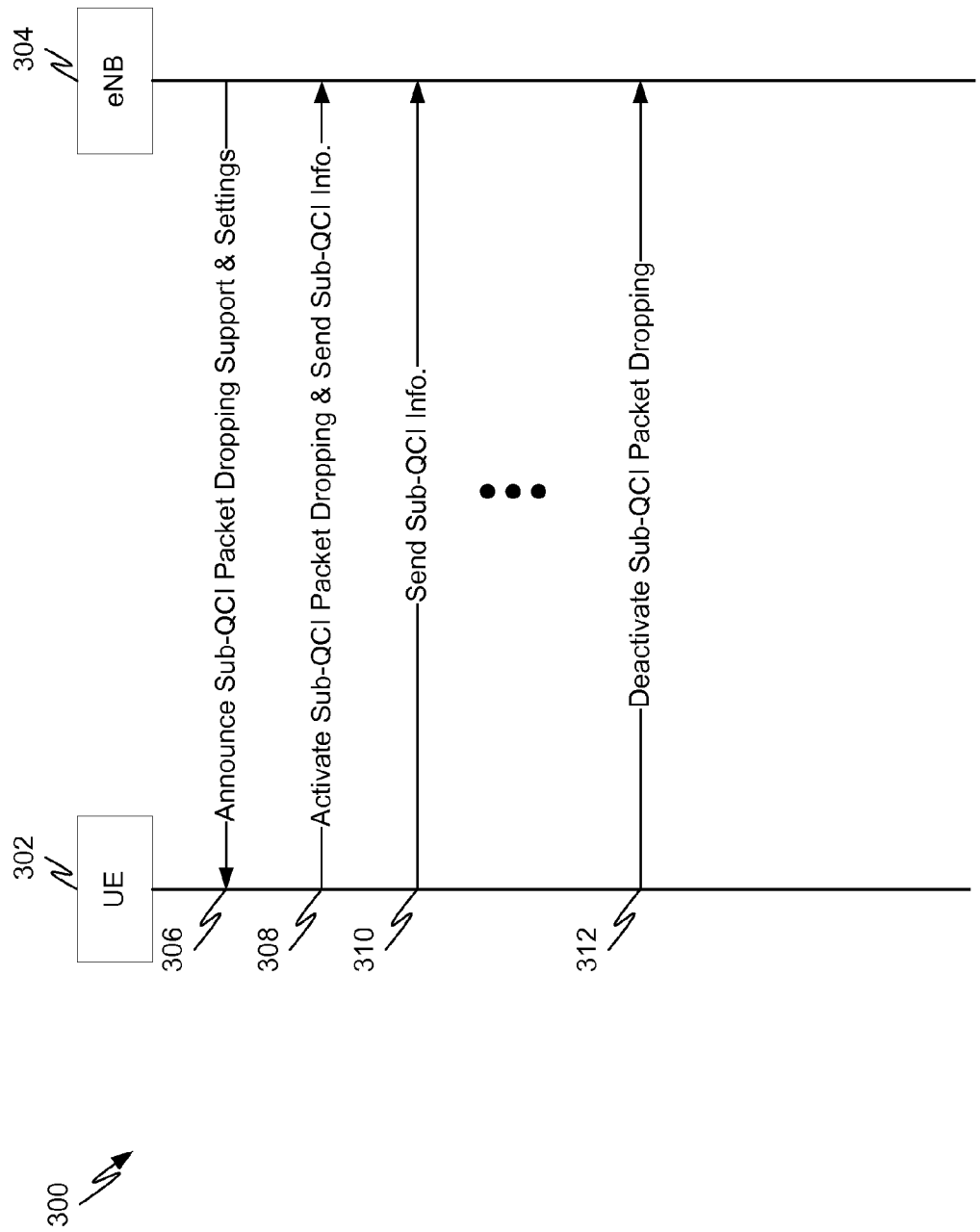
FIG. 3 illustrates an example message exchange between UE and an eNB for UE assisted packet dropping.

FIG. 3 illustrates an example message exchange protocol 300 between UE 302 and an eNB 304 for UE assisted packet dropping. The UE assisted packet dropping allows the UE 302 to request that the eNB 304 drop packets according to a priority scheme requested by the UE 302 in order to improve user experience, particularly in OTT services.

As discussed, data flows may be mapped to bearers using QCIs. Packets of different flows may have the same QCI, such as when multiple user programs (e.g., web browsing and video chat) use the same QCI (e.g., the default QCI 9). The different data flows in a given QCI may be assigned different sub-QCIs. Furthermore, packets of the same data flow (having the same QCI) may be further classified by assigning different sub-QCIs. Each sub-QCI can have its own QoS characteristics. For example, in one embodiment, the default bearer (QCI 9) supports two sub-classes: sub-QCI 1 and sub-QCI 2, each with their own QoS characteristics like delay threshold, priority and so forth. In an alternative embodiment, the default bearer (QCI 9) supports two sub-QCI sub-classes, QCI 8 supports three sub-QCI sub-classes, and QCI 7 supports four sub-QCI sub-classes. Other combinations are also possible with different QCIs supporting different sub-QCI sub-classes. Thus, sub-QCI characteristics are used in intra-QCI management and QCI characteristics are used in inter-QCI management.

The use of sub-QCIs allows the UE to request that packets having one sub-QCI be dropped according to criteria that differs from criteria used to drop packets with a different sub-QCI. In operation 306 an eNB 304 that supports UE assisted packet dropping informs the UE 302 and provides the settings it will support. Such settings include, for example, the number of sub-QCI values of each QCI that the eNB 304 will support. This information is sent in some embodiments using a Radio Resource Control (RRC) message. Such an RRC message can be a new RRC message or an existing RRC message that can be repurposed to include the information described above (e.g., that the eNB 304 supports UE assisted packet dropping and the requisite settings associated therewith).

In operation 308, the UE 302 sends a message to the eNB 304 activating its sub-QCI packet dropping functionality for identified QCI and sub-QCI. In one embodiment, the message contains:

(1) the QCI;
(2) the sub-QCI;
(3) the data flow information such as port number, IP address, protocol type, and so forth;
(4) the tolerable delay (e.g., the delay budget for sub-QCI traffic);
(5) the intra-flow classification information such as packet size and/or payload information; and
(6) the packet drop delay threshold (e.g., delay beyond which packets should be dropped).

The tolerable delay determines the delay requirement of the corresponding sub-QCI traffic. It is the same as "delay budget" for congestion detection discussed in conjunction with FIG. 4 below. However, a packet may still be delivered even if its delay exceeds the tolerable delay since it is the eNB that decides when packets are dropped and not the UE. If the packet drop delay threshold is set to less than the tolerable delay, then delivered packets will have delay less than tolerable delay.

In other embodiments, the message may contain either more or less information and not all the listed fields need be sent in all embodiments. For example, as explained below, some combination of intra-flow classification information and/or data flow information may be used to identify which packets are classified into which sub-QCI. However, if that information is already known by the eNB 304 or if that information is transferred in a different message to the eNB 304, then that information need not be repeated in this message if it is still valid. The message sent as part of operation 308 may be an RRC Some or all of the intra-flow classification information is used by the eNB in some embodiments to identify which packets should be assigned to which sub-QCI. In other embodiments some or all of the data flow information is used in conjunction with the intra-flow classification information to identify which packet is assigned to which sub-QCI. In still other embodiments, some or all of the data flow information is used to identify which packets are assigned to which sub-QCI. For example, data packets with an IP port destination of 7558 with a packet size of less than 200 bytes should be assigned to sub-QCI 2 and others should be assigned to sub-QCI 1.

The packet drop delay threshold specifies the delay after which a packet for a given sub-QCI should be dropped and not sent to the UE. In some embodiments, the packet drop delay threshold is an optional parameter. If the eNB 304 does not receive the packet drop delay threshold in these embodiments, it will utilize a default or previously known threshold. With multiple sub-QCIs, the delay of the higher priority sub-QCI is set to a higher threshold than a lower priority sub-QCI. With such an arrangement, when the network is congested, the lower priority packets will be dropped before the higher priority packets. In one embodiment, QCI 9 has two sub-QCI. The lower priority sub-QCI (e.g., sub-QCI 1) has a threshold of 50 ms. The higher priority sub-QCI (e.g., sub-QCI 2) has a threshold of 100 ms.

When the UE 302 initiates sub-QCI packet dropping, the eNB 304 measures the delay a packet has experienced in the Radio Link Control (RLC) queue. When a packet is dequeued from the RLC and is about to be sent to the Medium Access Control (MAC) layer, the eNB will check if its RLC queuing delay is less than the delay threshold for its sub-QCI. If so, the packet is kept and sent to the MAC layer. If the RLC queuing delay exceeds the delay threshold, then the packet is dropped. For RLC queuing delay equal to the delay threshold, different embodiments either drop the packet or keep the packet.

The general model for LTE networks is that the eNB 304 is in charge and manages the network and UEs. Thus under this model, UE 302 cannot direct the eNB 304 to perform any particular actions. The UE 302 may request actions that the eNB 304 decides it will perform, but ultimate control always resides with the eNB 304 and not with the UE 302. The eNB 304 may, therefore, drop packets before they reach the designated delay threshold in some embodiments. Said another way, the delay threshold may be requested by the UE 302, but the eNB 304 may adjust the delay threshold higher or lower in some embodiments.

In some embodiments, the UE 302 may perform operation 308 multiple times in order to activate different sub-QCI packet dropping functionality (e.g., for a different sub-QCI and/or QCI/sub-QCI pair).

Sometimes the UE 302 may desire to update the information to the eNB 304, such as changing delay thresholds or other information used by the eNB 304 in sub-QCI packet dropping. In operation 310, the UE updates the sub-QCI information and sends it to the eNB 304. The message used in operation 310 may contain some or all of the information of the message in operation 308 and described above.

In operation 312, the UE 302 sends a discontinuation message to the eNB 304 in order to deactivate the UE assisted sub-QCI packet dropping functionality. The information in the message may deactivate all such packet dropping functionality or may deactivate only packet dropping functionality for designated QCI and/or sub-QCI.

Figure 4:
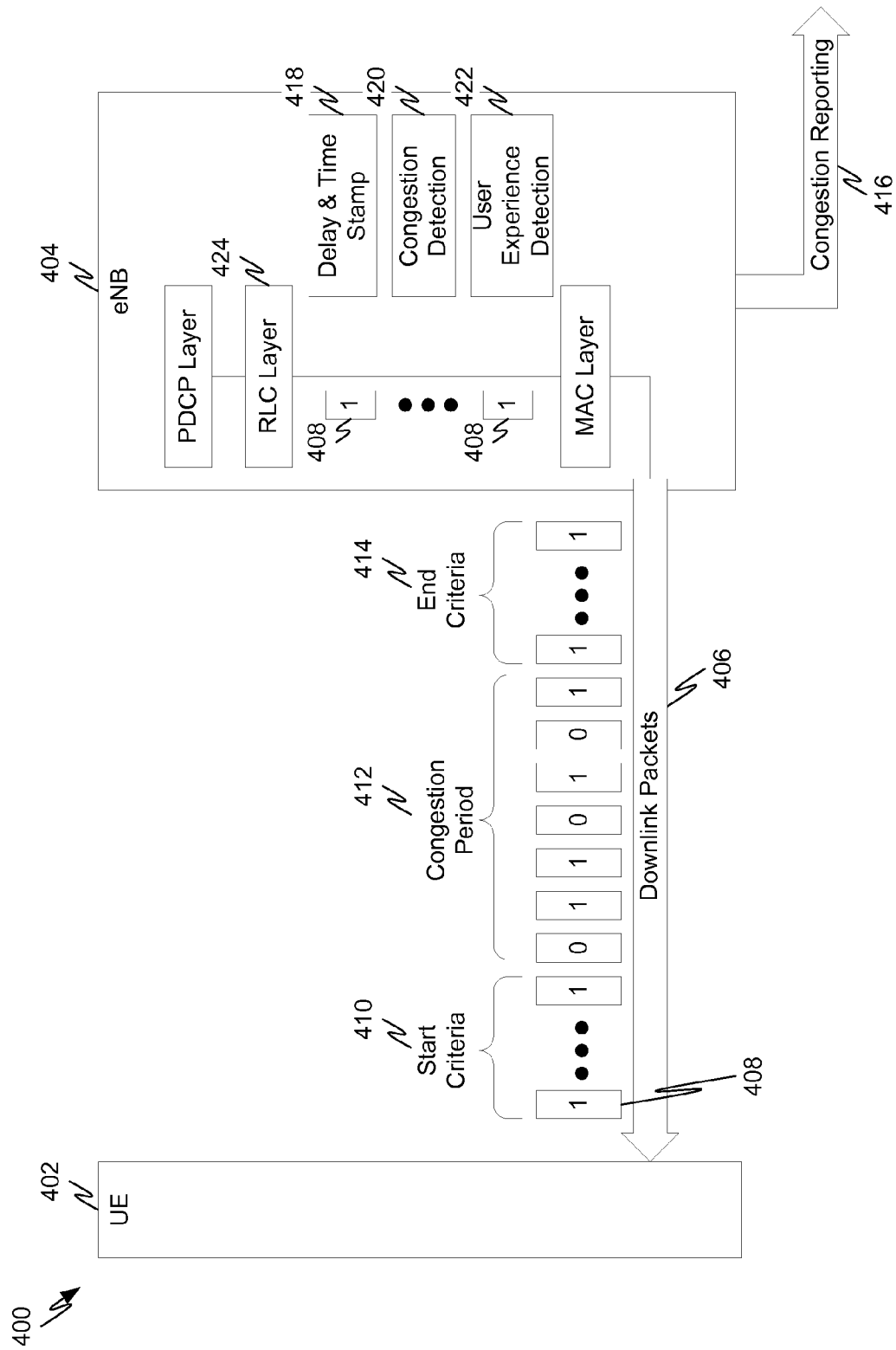
FIG. 4 illustrates an example of a packet stream between an eNB and UE where a congestion period is detected.

FIG. 4 illustrates an example 400 of a packet stream 406 between an eNB 404 and UE 402 where a congestion period is detected. Specifications, such as the 3GPP LTE Technical Specification 36.314 version 11.1.0 Release 11, publish metrics such as packet discard rate, Physical Resource Block (PRB) usage, packet delay, packet Uu (e.g., LTE air interface) loss rate, and scheduled IP throughput. However these metrics are all measured periodically and may not be effective for evaluating congestion and the user experience when using real-time applications such as Voice Over IP (VOIP), video conferencing and so forth. The diagram of FIG. 4 shows how an event-based congestion measurement and reporting mechanism can be implemented. The basic idea is centered around detecting a burst of packets experiencing excessive queuing delay. This is termed a congestion period in this disclosure. Congestion reporting is then triggered using one or more thresholds.

Each downlink packet 408 is measured at the eNB against its QCI delay budget and/or sub-QCI delay budget. If the delay is within the designated time, the packet is marked with a "1" in FIG. 4. If, however, the delay exceeds the designated time, it is marked with a "0" in FIG. 4. These designations, however, are simply for ease in explanation and embodiments need not mark or otherwise modify the downlink packets 408. In addition, each packet may be time stamped as it is dequeued from the RLC queue (e.g., represented by RLC layer 424). The delay measurement is illustrated, for example, by delay and time stamp module 418. However, delay measurement and time stamping may be performed by different modules and even measured at different points in the eNB processing of downlink packets 408.

The eNB detects congestion periods, for example, using a congestion detection module 420. The congestion detection module 420 detects congestion using a particular set of detection criteria. The detection criteria includes detecting the start of the congestion period by a start criteria 410, the congestion period 412 and detecting the end of the congestion period 412 by detecting an end criteria 414.

A congestion period will not start until the start criteria 410 is met. The start criteria is met when any packet has occurred that does not meet the delay budget (e.g., "0" packets).

The beginning of the congestion period 412 is detected by a "0" packet following "1" packets (e.g., the start criteria 410). In other words, the first packet where the delay exceeds the designated threshold will mark the beginning of a congestion period 412.

The congestion period ends when the ending criteria 414 is met. The ending of the congestion period occurs when $C_2$ successive packets that do not exceed the designated threshold (e.g., "1" packets) occur, and the congestion period has started. A typical value for $C_2$ is about 10, although different embodiments can set $C_2$ to a higher or lower value.

The length of the congestion period is measured by subtracting the time stamp of the last packet in a congestion period from the first packet in the congestion period. The length of the congestion period is a measure of the level of congestion. If the length congestion period is longer than a given threshold, $CP_1$, then congestion can be reported to the core network as indicated by arrow 416.

In some embodiments, criteria in addition to a congestion period of longer than a given length are used to trigger reporting the effect of congestion to the core network. For example, when events happen that detract from a user's experience, congestion can be reported to the core network. The additional criteria can be detected, for example, by user experience detection module 422. In general, a user's experience in relation to time-sensitive information is based on such criteria as packet loss rate and congestion length. If the packet loss rate climbs above a certain threshold, users will likely not have a good experience. Similarly, rather than simply looking at the length of a congestion period, comparing the length of the congestion period to a measurement window so that congestion of a certain length in a defined window will be reported to the core network. Thus, criteria can be established that defines when a user is "happy" and when a user is "unhappy." When the user is "unhappy," the congestion can be reported to the core network.

In some embodiments, a user is considered to be "happy" when in a given window, W, the packet loss rate (e.g., the packet discard rate) is below a given threshold (e.g., LR) and the length of a congestion period is shorter than a second length threshold (e.g., $CP_2$). Typical values set the window length W to 2 seconds, the loss rate LR to 10% and the second length threshold $CP_2$ to about 0.5 seconds.

Packet loss rate is measured in some embodiments by counting the number of packets that are dropped and/or otherwise lost for a flow. The packet loss rate can also be measured as defined in TS 36.314 version 11.1.0 Release 11, previously referenced. The congestion length is measured in some embodiments in a manner similar to that discussed above (e.g., a start criteria, followed by detection of the congestion period), but is set within a measurement window. The measurement window can be a fixed window or can be a sliding window. Thus, some embodiments implement the measurement window as a fixed window and some embodiments implement the measurement window as a sliding window. Whenever a congestion period within the window exceeds the threshold $CP_2$, the user is considered to be unhappy.

Figure 5:
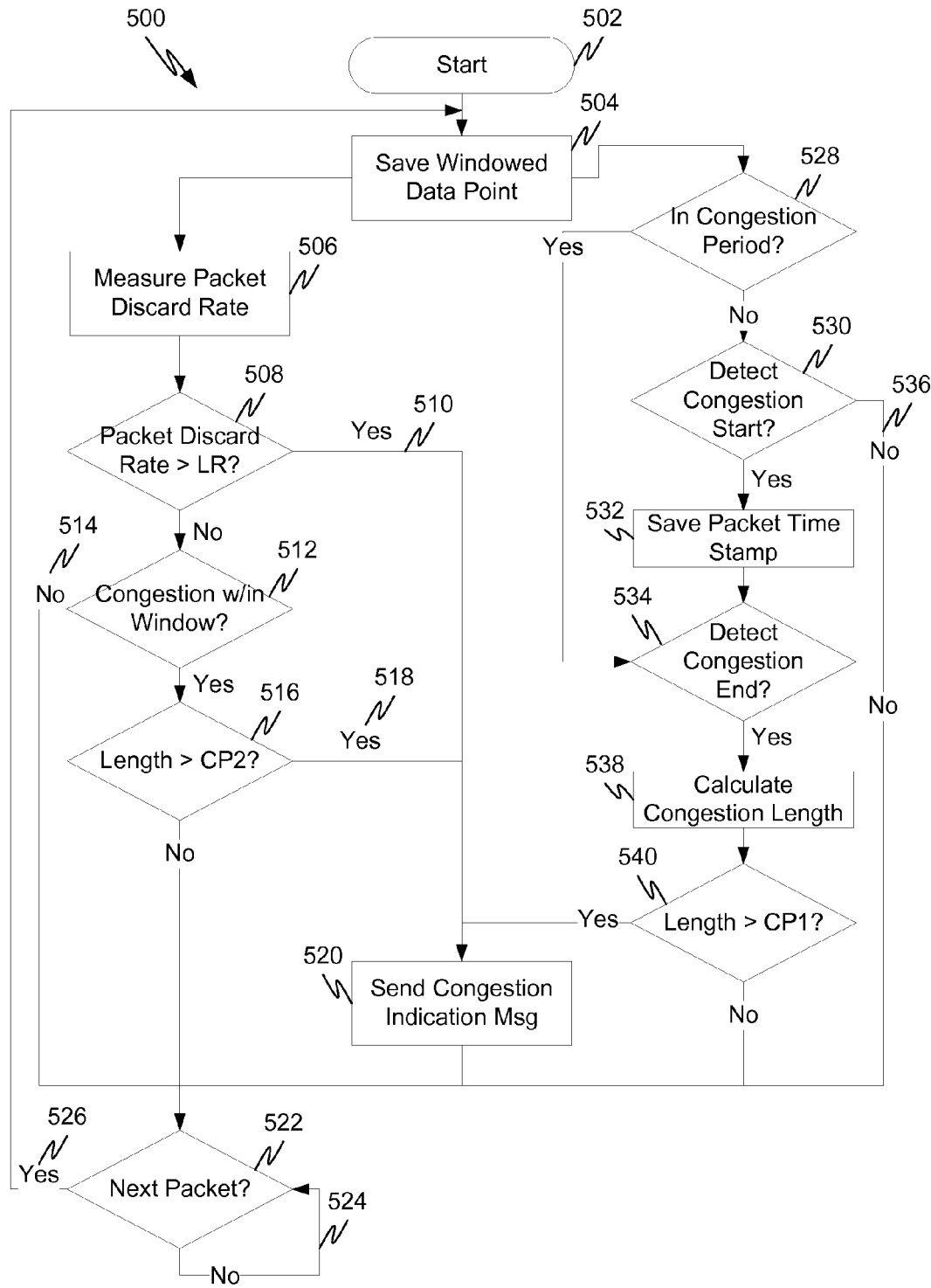
FIG. 5 illustrates an example flow diagram where an eNB detects and reports congestion.

FIG. 5 illustrates an example flow diagram 500 where an eNB detects and reports congestion. The diagram of FIG. 5 illustrates, for example, a representative implementation of congestion detection module 420 and user experience detection 422.

The diagrams starts at start indicator 502 when the next downlink packet is available. Operation 504 saves the information about the downlink packet so that the window, W, can be evaluated, as explained in conjunction with the user experience detection module 422 above.

Operation 528 evaluates whether a congestion period has previously been detected. If so, the eNB is watching for the end of the congestion period and the "yes" branch is taken to operation 534, which tests for the end of the congestion period. If not, then the "no" branch is taken to operation 530, which tests to see whether the start criteria has been met.

In one embodiment, the start criteria is met when $C_1$ consecutive downlink packets have been within the designated delay budget for the QCI and/or sub-QCI. Anytime after that event, a packet that does not fall within the delay budget for the QCI and/or sub-QCI will begin a congestion period. While the start criteria has not been met and no congestion period has been detected, the "no" branch 536 is taken to operation 522 which waits for the next downlink packet as indicated by looping "no" branch 524.

Once the start criteria has been met and the start of a congestion period has been detected, the yes branch is taken from operation 530 to operation 532 where the time stamp of the first packet in the congestion period is saved. Thereafter, the packets will be examined watching for the end of the detection period as previously described.

When operation 534 detects the end of the congestion period, the "yes" branch is taken to operation 538, which calculates the length of the congestion period. Some embodiments perform this operation by subtracting the time stamp of the last packet in the congestion period from the time stamp of the first packet in the congestion period that was saved in operation 532. The end of the congestion period is detected when $C_2$ consecutive packets that do not exceed the QCI/sub-QCI delay threshold occur.

Operation 540 compares the length of the congestion period to a threshold (e.g., $CP_1$) and if the length is greater than the threshold, the "yes" branch is taken to operation 520, which sends a congestion indication message to the core network. If the congestion period is shorter than the threshold, then no action is taken and the system waits for the next packet (e.g., operation 522).

The above operations describe how a representative embodiment detects the start criteria, waits for the end criteria and then calculates the length of the congestion period by subtracting the time stamp of the first packet of the congestion period from the time stamp of the last packet in the congestion period. If the length is greater than the threshold, then it sends the congestion indication message. An alternative embodiment does not wait until the end of the congestion period before deciding whether or not to send the congestion indication message, based on the length of the congestion period. In such an alternative embodiment, after the eNB detects the start of the congestion period, the length of the congestion period is updates as each new packet arrives and if the length exceeds the threshold at any time (e.g., CP1), the congestion indication message is sent. Thus, in these embodiments, the eNB will not wait until the end of the congestion period to determine whether to send the congestion indication message. Such an embodiment can be illustrated by modifying the "yes" branch out of operation 528 to branch to operation 538, rather than operation 534 as indicated.

The operations described are those that can be implemented, for example, by the congestion detection module 420. The user experience detection is also indicated in FIG. 5, starting with operation 506. In operation 506, the packet loss rate 506 is checked. This occurs in some embodiments by updating the loss rate as each packet arrives. In other embodiments, the loss rate is measured by other modules/logic and operation 506 represents a retrieval of the loss rate calculated on a different time schedule.

Operation 508 checks the packet loss rate to see if it is greater than a threshold (e.g., LR). If so, the "yes" branch 510 is taken and the congestion indication message is sent in operation 520.

Although the embodiment of FIG. 5 shows the loss rate being checked as each packet arrives, if the loss rate is measured on a different schedule and does not change with each packet, operations 506 and 508 only need be performed when the loss rate is updated. Otherwise, they can be skipped for the present iteration.

Operation 512 detects whether there is congestion within the measurement window. Said another way, operation 512 detects whether a congestion period has been detected within the current measurement window. A congestion period is detected as described elsewhere, such as when $C_1$ packets that do not exceed the delay threshold for a given QCI and/or sub-QCI are followed by a packet that does exceed the delay threshold for the QCI and/or sub-QCI. If a congestion period is detected within the measurement window, the "yes" branch is taken to operation 516, which detects whether the length of the congestion period within the window exceeds a threshold (e.g., $CP_2$). If so, then the congestion indication message is sent as indicated by operation 520.

If there is no congestion within the measurement window or if the length is less than the threshold (e.g., $CP_2$), then the system waits at operation 522 until the next packet arrives.

Operations 506, 508, 512, 516, and 520 collectively represent operations that can be implemented by the user experience detection module 422 to send a congestion indication message when the eNB detects that a user is not "happy".

Figure 6:
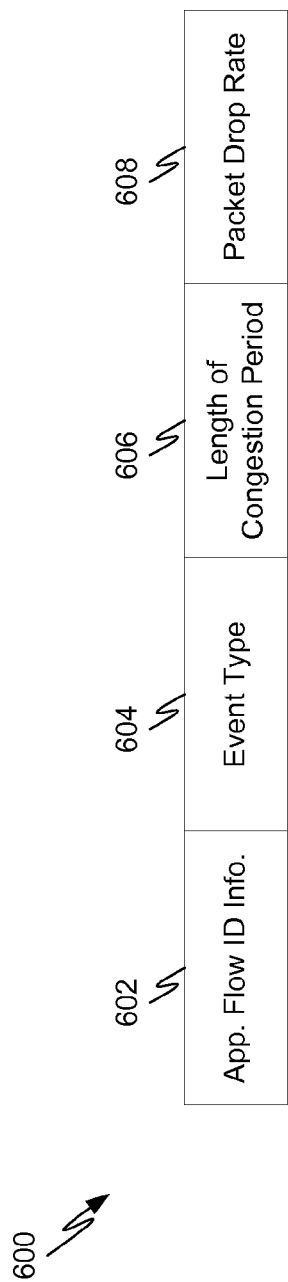
FIG. 6 illustrates an example message for an eNB to report congestion to the core network.

FIG. 6 illustrates an example message 600 for an eNB to report congestion to the core network, such as the congestion indication message sent by operation 520 of FIG. 5. Message 600 represents the "data" portion of such a message and embodiments of the message may contain headers and/or other information. Similarly, not all the identified fields need be sent in every message in every embodiment. Thus, such a message may comprise one or more of:

(1) Application flow identification information 602 such as bearer ID, QCI, sub-QCI and/or other such information;

(2) Event type 604, which in some embodiments is a "1" indicating that a user is not "happy" or a "0" indicating that a congestion period has exceeded the threshold (e.g., $CP_1$);

(3) Length of the congestion period; and (4) Packet drop rate.

Example Device Architecture and Machine-Readable Medium

Figure 7:
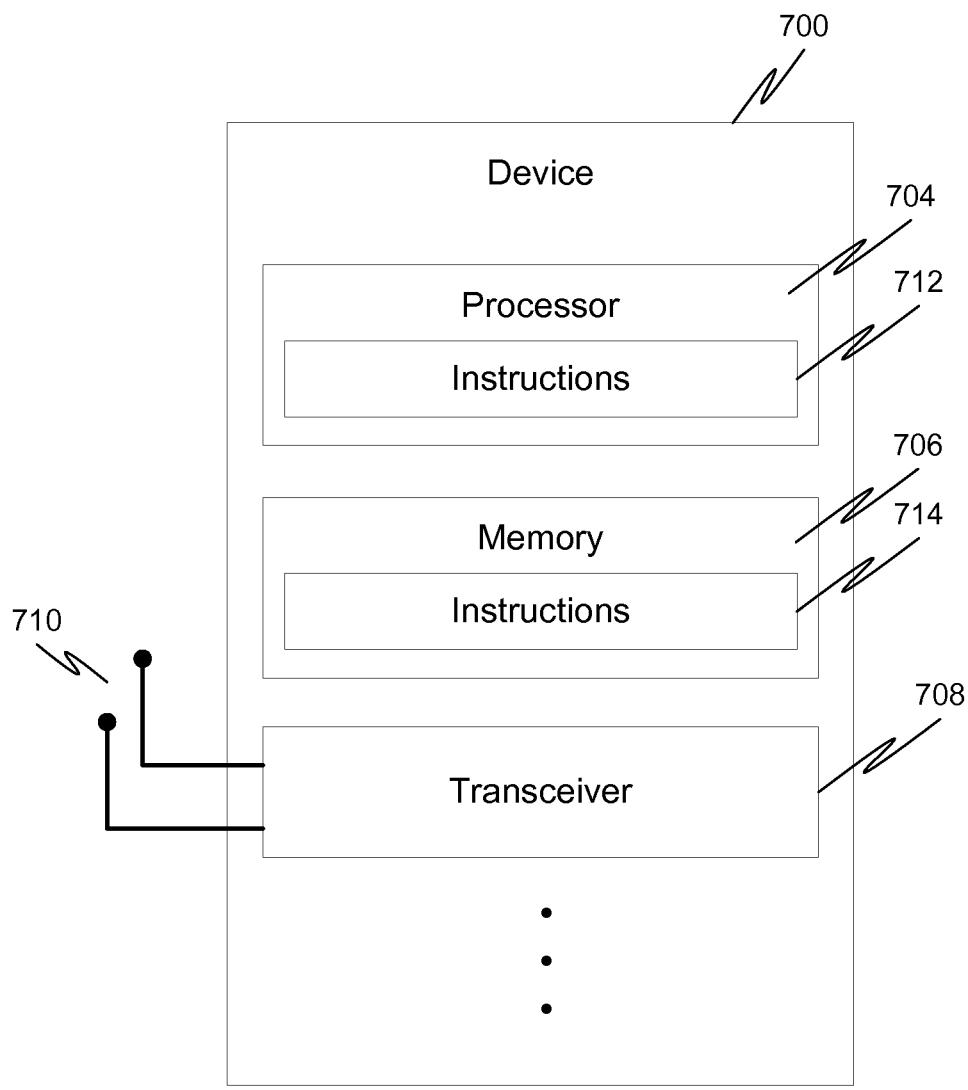
FIG. 7 illustrates a system block diagram of a wireless device, according to some embodiments.

FIG. 7 illustrates a system block diagram of a wireless device 700, according to some embodiments. Such a wireless device 700 can represent, for example, an eNB and/or a UE as described in conjunction with FIGS. 1-6 above. The procedures, message exchanges, and so forth described above are suitable for implementation on the illustrated device 700.

The device 700 may include a processor 704, a memory 706, a transceiver 708, antennas 710, instructions 712, 714, and possibly other components (not shown).

The processor 704 comprises one or more central processing units (CPUs), graphics processing units (GPUs), accelerated processing units (APUs), signal processors, or various combinations thereof. The processor 704 provides processing and control functionalities for the device 700 and may implement the flow diagrams and logic described above for the eNBs and UEs of FIGS. 1-6.

The memory 706 comprises one or more transient and/or static memory units configured to store instructions 712, 714 and data for the device 700. The transceiver 708 comprises one or more transceivers including, for an appropriate station or responder, a multiple-input and multiple-output (MIMO) antenna to support MIMO communications. For the device 700, the transceiver 708 receives transmissions and transmits transmissions. The transceiver 708 may be coupled to the antennas 710, which represent an antenna or multiple antennas, as appropriate to the device 700. The UE and eNB may operate in a primary band and a secondary bands and may be adapted to tune to any secondary band to which license is granted.

The instructions 712, 714 comprise one or more sets of instructions or firmware/software executed on a computing device (or machine) to cause such a computing device (or machine) to perform any of the methodologies discussed herein. The instructions 712, 714 (also referred to as computer- or machine-executable instructions) may reside, completely or at least partially, within the processor 704 and/or the memory 706 during execution thereof by the device 700. While the instructions 712 and 714 are illustrated as separate, they can be part of the same whole. The processor 704 and the memory 706 also comprise machine-readable storage media. The instructions 712 and 714 may implement, for example, all or part of the flow associated with FIG. 5 or other described operations attributed to the eNBs and/or the UE. Additionally, or alternatively, the instructions 712 and 714 may implement other processing and functionality discussed in conjunction with the other embodiments above.

Processing Circuitry

In FIG. 7, processing and control functionalities are illustrated as being provided by the processor 704 along with the associated instructions 712 and 714. However, these are only examples of processing circuitry that comprise programmable logic or circuitry (e.g., as encompassed within a general-purpose processor 804 or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement processing circuitry mechanically, in dedicated and permanently configured circuitry, or in temporarily configured circuitry (e.g., configured by software) may be driven by cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

Machine-Readable Medium

The instructions 712, 714 are illustrated as being stored on memory 706 and/or in processor 704. While the memory 706 and/or processor 704 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 712/714 may further be transmitted or received such as by transceiver circuitry 708 and/or antennas 710 using a transmission medium. The instructions 712/714 may be transmitted using any one of a number of well-known transfer protocols. Transmission medium encompasses mechanisms by which the instructions 712/714 are transmitted, such as communication networks. The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The following represent example embodiments:

Example 1

A method performed by an enhanced Node B (eNB) comprising:

receiving, from a user equipment (UE), a first message to initiate sub-quality of service class identifier (sub-QCI) packet dropping, the first message comprising a sub-QCI for a QCI;

identifying a packet dropping delay threshold for the sub-QCI;

testing whether a packet belonging to the sub-QCI exceeds the delay threshold; and responsive to the packet exceeding the delay threshold, dropping the packet.

Example 2

The method of example 1, further comprising receiving a second message from the UE updating sub-QCI information.

Example 3

The method of example 1, wherein the first message comprises at least one of:
Internet Protocol (IP) flow classification information;
the packet dropping delay threshold for the sub-QCI; and
an intra-flow classification parameter.

Example 4

The method of examples 1 2 or 3, wherein the first message comprises a plurality of sub-QCI for the QCI.

Example 5

The method of example 4, wherein for each of the plurality of sub-QCI, the first message comprises at least one of:
Internet Protocol (IP) flow classification information;
the delay threshold for the sub-QCI; and
an intra-flow classification parameter.

Example 6

The method of example 5, wherein the plurality of sub-QCI are prioritized and wherein the delay threshold for a higher priority sub-QCI is longer than the delay threshold for a lower priority sub-QCI.

Example 7

The method of examples 1, 2 or 3 further comprising receiving from the UE a deactivate message deactivating sub-QCI packet dropping.

Example 8

An enhanced node B (eNB) comprising:
at least one antenna;
transceiver circuitry coupled to the at least one antenna;
memory;
a processor coupled to the memory and transceiver circuitry; and
instructions, stored in the memory, which when executed cause the processor to:
receive, from user equipment (UE), a first message to initiate sub-quality of service class identifier (sub-QCI) packet dropping, the first message comprising a sub-QCI for a QCI;
identify a delay threshold for the sub-QCI;
test whether a packet belonging to the sub-QCI exceeds the delay threshold; and
responsive to the packet exceeding the delay threshold, drop the packet.

Example 9

The eNB of example 8, wherein the instructions further cause the process or to receive a second message from the UE updating sub-QCI information.

Example 10

The eNB of example 8, wherein the first message comprises at least one of:
Internet Protocol (IP) flow classification information;
the delay threshold for the sub-QCI; and
an intra-flow classification parameter.

Example 11

The eNB of examples 8, 9 or 10 wherein the first message comprises a plurality of sub-QCI for the QCI.

Example 12

The eNB of example 11, wherein for each of the plurality of sub-QCI, the first message comprises at least one of:
Internet Protocol (IP) flow classification information;
the delay threshold for the sub-QCI; and
an intra-flow classification parameter.

Example 13

The eNB of example 12, wherein the plurality of sub-QCI are prioritized and wherein the delay threshold for a higher priority sub-QCI is longer than the delay threshold for a lower priority sub-QCI.

Example 14

The eNB of examples 8, 9 or 10 wherein the instructions further cause the processor to receive from the UE a deactivate message deactivating sub-QCI packet dropping.

Example 15

User Equipment (UE) comprising:
at least one antenna;
transceiver circuitry coupled to the at least one antenna;
memory;
a processor coupled to the memory and transceiver circuitry; and
instructions, stored in the memory, which when executed cause the processor to:
send, to an enhanced Node B (eNB), a first message to initiate sub-quality of service class identifier (sub-QCI) packet dropping by the eNB, the first message comprising a sub-QCI for a QCI;
receive a plurality of data packets from the eNB; and
send to the eNB, a second message to discontinue sub-QCI packet dropping by the eNB.

Example 16

The UE of example 15, wherein the instructions further cause the processor to send an update message to the eNB updating sub-QCI information.

Example 17

The UE of examples 15 or 16 wherein the first message comprises a plurality of sub-QCI for the QCI and wherein for each of the plurality of sub-QCI, the first message comprises at least one of:
Internet Protocol (IP) flow classification information;
the delay threshold for the sub-QCI; and
an intra-flow classification parameter.

Example 18

A machine readable medium having executable instructions embodied thereon that, when executed, configure a device to:
receive, from user equipment (UE), a first message to initiate sub-quality of service class identifier (sub-QCI) packet dropping, the first message comprising a sub-QCI for a QCI;
identify a delay threshold for the sub-QCI;
test whether a packet belonging to the sub-QCI exceeds the delay threshold; and
responsive to the packet exceeding the delay threshold, drop the packet.

Example 19

The machine readable medium of example 18, wherein the instructions further cause the processor to receive an discontinuation message from the UE and responsive to the reception of the discontinuation message terminate dropping packets that exceed the delay threshold.

Example 20

The machine-readable medium of examples 18 or 19 wherein the first message comprises a plurality of sub-QCI for the QCI and wherein for each of the plurality of sub-QCI, the first message comprises at least one of:
Internet Protocol (IP) flow classification information;
the delay threshold for the sub-QCI; and
an intra-flow classification parameter.

Example 21

A method performed by an enhanced node B (eNB) comprising:
identifying a Quality of Service Class Identifier (QCI) delay for each of a plurality of downlink packets;
determining whether the QCI delay for each of the plurality of downlink packets exceeds a delay threshold;
determining a start of a congestion period responsive to a number of consecutive downlink packets that do not exceed the delay threshold reaching a first count threshold followed by a downlink packet that does exceed the delay threshold;
determining an end of the congestion period responsive to a number of consecutive downlink packets that do not exceed the delay threshold reaching a second count threshold;
determining a length of the congestion period; and
sending a congestion indication message to a core network when the length of the congestion period exceeds a first length threshold.

Example 22

The method of example 21, wherein the second count threshold is the same as the first count threshold.

Example 23

The method of example 21, wherein each packet is assigned a time stamp when de-queued from a Radio Link Control layer of the eNB and wherein the length of the congestion period is calculated by subtracting the time stamp on a last packet of the congestion period from the time stamp a first packet of the congestion period.

Example 24

The method of examples 21, 22 or 23 further comprising:
establishing a window defining a length of time within which downlink packets will be examined;
retrieving a second length threshold; and
sending the congestion indication message to the core network responsive to the length of the congestion period exceeding the second length threshold within the window.

Example 25

The method of example 24, further comprising:
calculating a packet discard rate within the window;
sending the congestion indication message to the core network responsive to the packet discard rate exceeding a discard rate threshold.

Example 26

The method of examples 21, 22 or 23 wherein the congestion period is measured on a per-bearer basis.

Example 27

An enhanced node B (eNB) comprising:
at least one antenna;
transceiver circuitry coupled to the at least one antenna;
memory;
a processor coupled to the memory and transceiver circuitry; and
instructions, stored in the memory, which when executed cause the processor to:
identify a Quality of Service Class Identifier (QCI) delay for each of a plurality of downlink packets;
determine whether the QCI delay for each of the plurality of downlink packets exceeds a delay threshold;
determine a start of a congestion period responsive to a number of consecutive downlink packets that do not exceed the delay threshold reaching a first count threshold followed by a downlink packet that does exceed the delay threshold;
determine an end of the congestion period responsive to a number of consecutive downlink packets that do not exceed the delay threshold reaching a second count threshold;
determine a length of the congestion period; and
send a congestion indication message to a core network when the length of the congestion period exceeds a first length threshold.

Example 28

The eNB of example 27, wherein the second count threshold is the same as the first count threshold.

Example 29

The eNB of example 27, wherein each packet is assigned a time stamp when de-queued from a Radio Link Control layer of the eNB and wherein the length of the congestion period is calculated by subtracting the time stamp on a last packet of the congestion period from the time stamp a first packet of the congestion period.

Example 30

The eNB of example 27, wherein the instructions further cause the processor to:
establish a window defining a length of time within which downlink packets will be examined;
retrieve a second length threshold; and
send the congestion indication message to the core network responsive to the length of the congestion period exceeding the second length threshold within the window.

Example 31

The eNB of example 30, wherein the instructions further cause the processor to:
calculate a packet discard rate within the window;
send the congestion indication message to the core network responsive to the packet discard rate exceeding a discard rate threshold.

Example 32

The eNB of examples 27, 28, 29, 30 or 31 wherein the congestion period is measured on a per-bearer basis.

Example 33

A machine readable medium having executable instructions embodied thereon that, when executed, configure a device to:
identify a Quality of Service Class Identifier (QCI) delay for each of a plurality of downlink packets;
determine whether the QCI delay for each of the plurality of downlink packets exceeds a delay threshold;
determine a start of a congestion period responsive to a number of consecutive downlink packets that do not exceed the delay threshold reaching a first count threshold followed by a downlink packet that does exceed the delay threshold;
determine an end of the congestion period responsive to a number of consecutive downlink packets that do not exceed the delay threshold reaching a second count threshold;
determine a length of the congestion period; and
send a congestion indication message to a core network when the length of the congestion period exceeds a first length threshold.

Example 34

The machine readable medium of example 33, wherein the second count threshold is the same as the first count threshold.

Example 35

The machine readable medium of example 33, wherein each packet is assigned a time stamp when de-queued from a Radio Link Control layer and wherein the length of the congestion period is calculated by subtracting the time stamp on a last packet of the congestion period from the time stamp a first packet of the congestion period.

Example 36

The machine readable medium of examples 33, 34 or 35 wherein the instructions further configure the device to:
establishing a window defining a length of time within which downlink packets will be examined;
retrieving a second length threshold; and
sending the congestion indication message to the core network responsive to the length of the congestion period exceeding the second length threshold within the window.

Example 37

The machine readable medium of example 36, wherein the instructions further configure the device to:
calculate a packet discard rate within the window;
send the congestion indication message to the core network responsive to the packet discard rate exceeding a discard rate threshold.

Example 38

The machine readable medium of examples 33, 34 or 35 wherein the congestion period is measured on a per-bearer basis.

Example 39

An enhanced node B (eNB) comprising hardware processing circuitry comprising:
congestion detection processing circuitry configured to:
identify a Quality of Service Class Identifier (QCI) delay for each of a plurality of downlink packets;
determine whether the QCI delay for each of the plurality of downlink packets exceeds a delay threshold;
determine a start of a congestion period responsive to a start criteria;
determine an end of the congestion period responsive to a number of consecutive downlink packets that do not exceed the delay threshold reaching a second count threshold;
determine a length of the congestion period; and
send a congestion indication message to a core network when the length of the congestion period exceeds a first length threshold; and
sub-quality of service class identifier (sub-QCI) packet dropping processing circuitry configured to:
receive, from a user equipment (UE), a first message to initiate sub-QCI packet dropping, the first message comprising a sub-QCI for a QCI;
identify a sub-QCI packet dropping delay threshold for the sub-QCI;
test whether a packet belonging to the sub-QCI exceeds the sub-QCI delay threshold; and
responsive to the packet belonging to the sub-QCI exceeding the delay threshold, make a decision whether to drop the packet belonging to the sub-QCI.

Example 40

The eNB of example 39, wherein the start criteria occurs upon a first packet exceeding the delay threshold after at least one packet not exceeding the delay threshold.

Example 41

The eNB of example 39, wherein each packet of the plurality of packets is assigned a time stamp when de-queued from a Radio Link Control layer of the eNB and wherein the length of the congestion period is calculated by subtracting the time stamp on a last packet of the congestion period from the time stamp a first packet of the congestion period.

Example 42

The eNB of examples 39, 40 or 41 wherein the congestion detection processing circuitry is further configured to:
  establish a window defining a length of time within which downlink packets will be examined;
  retrieve a second length threshold; and
  send the congestion indication message to the core network responsive to the length of the congestion period exceeding the second length threshold within the window.

Example 43

The eNB of example 42, wherein the congestion detection processing circuitry is further configured to:
  calculate a packet discard rate within the window;
  send the congestion indication message to the core network responsive to the packet discard rate exceeding a discard rate threshold.

Example 44

The eNB of examples 39, 40 or 41 wherein the congestion period is measured on a per-bearer basis.

Example 45

The eNB of examples 39, 40 or 41 wherein the sub-QCI packet dropping processing circuitry is further configured to receive a second message from the UE updating sub-QCI information.

Example 46

The eNB of examples 39, 40 or 41 wherein the first message comprises at least one of:
  Internet Protocol (IP) flow classification information;
  the sub-QCI packet dropping delay threshold; and
  an intra-flow classification parameter.

Example 47

The eNB of examples 39, 40 or 41 wherein the first message comprises a plurality of sub-QCI for the QCI and for each of the plurality of sub-QCI, the first message comprises at least one of:
  Internet Protocol (IP) flow classification information;
  the sub-QCI packet dropping delay threshold for the sub-QCI; and
  an intra-flow classification parameter.

Example 48

The eNB of example 47, wherein the plurality of sub-QCI are prioritized and wherein the delay threshold for a higher priority sub-QCI is longer than the delay threshold for a lower priority sub-QCI.

Example 49

An method performed by an enhanced node B (eNB) comprising:
  detecting congestion at the eNB by performing operations comprising:
    identifying a Quality of Service Class Identifier (QCI) delay for each of a plurality of downlink packets;
    determining whether the QCI delay for each of the plurality of downlink packets exceeds a delay threshold;
    determining a start of a congestion period responsive to a start criteria;
    determining an end of the congestion period responsive to a number of consecutive downlink packets that do not exceed the delay threshold reaching a second count threshold;
    determining a length of the congestion period; and
    sending a congestion indication message to a core network when the length of the congestion period exceeds a first length threshold; and
  utilizing sub-quality of service class identifier (sub-QCI) packet dropping by performing operations comprising:
    receiving, from a user equipment (UE), a first message to initiate sub-QCI packet dropping, the first message comprising a sub-QCI for a QCI;
    identifying a sub-QCI packet dropping delay threshold for the sub-QCI;
    testing whether a packet belonging to the sub-QCI exceeds the sub-QCI delay threshold; and
    responsive to the packet belonging to the sub-QCI exceeding the delay threshold, making a decision whether to drop the packet belonging to the sub-QCI.

Example 50

The method of example 49, wherein the start criteria occurs upon a first packet exceeding the delay threshold after at least one packet not exceeding the delay threshold.

Example 51

The method of example 49, wherein each packet of the plurality of packets is assigned a time stamp when de-queued from a Radio Link Control layer of the eNB and wherein the length of the congestion period is calculated by subtracting the time stamp on a last packet of the congestion period from the time stamp a first packet of the congestion period.

Example 52

The method of example 49, wherein detecting congestion further comprises:
  establishing a window defining a length of time within which downlink packets will be examined;
  retrieving a second length threshold; and sending the congestion indication message to the core network responsive to the length of the congestion period exceeding the second length threshold within the window.

Example 53

The method of example 52, wherein detecting congestion further comprises:
calculating a packet discard rate within the window; and
sending the congestion indication message to the core network responsive to the packet discard rate exceeding a discard rate threshold.

Example 54

The method of example 49, wherein the congestion period is measured on a per-bearer basis.

Example 55

The method of example 49, wherein utilizing sub-QCI packet further comprises receiving a second message from the UE updating sub-QCI information.

Example 56

The method of example 49, wherein the first message comprises at least one of:
Internet Protocol (IP) flow classification information;
the sub-QCI packet dropping delay threshold; and
an intra-flow classification parameter.

Example 57

The method of examples 49, 50, 51, 52, 53, 54, 55 or 56 wherein the first message comprises a plurality of sub-QCI for the QCI and for each of the plurality of sub-QCI, the first message comprises at least one of:
Internet Protocol (IP) flow classification information;
the sub-QCI packet dropping delay threshold for the sub-QCI; and
an intra-flow classification parameter.

Example 58

The method of example 57, wherein the plurality of sub-QCI are prioritized and wherein the delay threshold for a higher priority sub-QCI is longer than the delay threshold for a lower priority sub-QCI.

Example 59

A machine readable medium having executable instructions embodied thereon that, when executed, configure a device to:
identify a Quality of Service Class Identifier (QCI) delay for each of a plurality of downlink packets;
determine whether the QCI delay for each of the plurality of downlink packets exceeds a delay threshold;
determine a start of a congestion period responsive to a start criteria;
determine an end of the congestion period responsive to a number of consecutive downlink packets that do not exceed the delay threshold reaching a second count threshold;
determine a length of the congestion period;

send a congestion indication message to a core network when the length of the congestion period exceeds a first length threshold;
receive, from a user equipment (UE), a first message to initiate sub-QCI packet dropping, the first message comprising a sub-QCI for a QCI;
identify a sub-QCI packet dropping delay threshold for the sub-QCI;
test whether a packet belonging to the sub-QCI exceeds the sub-QCI delay threshold; and
responsive to the packet belonging to the sub-QCI exceeding the delay threshold, make a decision whether to drop the packet belonging to the sub-QCI.

Example 60

The machine readable medium of example 59, wherein the start criteria occurs upon a first packet exceeding the delay threshold after at least one packet not exceeding the delay threshold.

Example 61

The machine readable medium of example 59, wherein each packet of the plurality of packets is assigned a time stamp when de-queued from a Radio Link Control layer of the eNB and wherein the length of the congestion period is calculated by subtracting the time stamp on a last packet of the congestion period from the time stamp a first packet of the congestion period.

Example 62

The machine readable medium of example 59, wherein instructions further configured the device to:
establish a window defining a length of time within which downlink packets will be examined;
retrieve a second length threshold; and
send the congestion indication message to the core network responsive to the length of the congestion period exceeding the second length threshold within the window.

Example 63

The machine readable medium of example 62, wherein instructions further configured the device to:
calculate a packet discard rate within the window;
send the congestion indication message to the core network responsive to the packet discard rate exceeding a discard rate threshold.

Example 64

The machine readable medium of example 59, wherein the congestion period is measured on a per-bearer basis.

Example 65

The machine readable medium of example 59, wherein instructions further configured the device to receive a second message from the UE updating sub-QCI information.

Example 66

The machine readable medium of example 59, wherein the first message comprises at least one of:
Internet Protocol (IP) flow classification information;
the sub-QCI packet dropping delay threshold; and
an intra-flow classification parameter.

Example 67

The machine readable medium of examples 59, 60, 61, 62, 63, 64, 65 or 66, wherein the first message comprises a plurality of sub-QCI for the QCI and for each of the plurality of sub-QCI, the first message comprises at least one of:
Internet Protocol (IP) flow classification information;
the sub-QCI packet dropping delay threshold for the sub-QCI; and
an intra-flow classification parameter.

Example 68

The machine readable medium of example 67, wherein the plurality of sub-QCI are prioritized and wherein the delay threshold for a higher priority sub-QCI is longer than the delay threshold for a lower priority sub-QCI.

What is claimed is:

1. An enhanced node B (eNB) comprising hardware processing circuitry comprising:
   congestion detection processing circuitry configured to:
      identify a Quality of Service Class Identifier (QCI) delay for each of a plurality of downlink packets;
      determine whether the QCI delay for each of the plurality of downlink packets exceeds a delay threshold;
      determine a start of a congestion period responsive to a start criteria;
      determine an end of the congestion period responsive to a number of consecutive downlink packets that do not exceed the delay threshold reaching a second count threshold;
      determine a length of the congestion period; and
      send a congestion indication message to a core network when the length of the congestion period exceeds a first length threshold; and
   sub-quality of service class identifier (sub-QCI) packet dropping processing circuitry configured to:
      receive, from a user equipment (UE), a first message to initiate sub-QCI packet dropping, the first message comprising a sub-QCI for a QCI;
      identify a sub-QCI packet dropping delay threshold for the sub-QCI;
      test whether a packet belonging to the sub-QCI exceeds the sub-QCI delay threshold; and
      responsive to the packet belonging to the sub-QCI exceeding the delay threshold, make a decision whether to drop the packet belonging to the sub-QCI.

2. The eNB of claim 1, wherein the start criteria occurs upon a first packet exceeding the delay threshold after at least one packet not exceeding the delay threshold.

3. The eNB of claim 1, wherein each packet of the plurality of packets is assigned a time stamp when dequeued from a Radio Link Control layer of the eNB and wherein the length of the congestion period is calculated by subtracting the time stamp on a last packet of the congestion period from the time stamp a first packet of the congestion period.

4. The eNB of claim 1, wherein the congestion detection processing circuitry is further configured to:
   establish a window defining a length of time within which downlink packets will be examined;
   retrieve a second length threshold; and
   send the congestion indication message to the core network responsive to the length of the congestion period exceeding the second length threshold within the window.

5. The eNB of claim 4, wherein the congestion detection processing circuitry is further configured to:
   calculate a packet discard rate within the window;
   send the congestion indication message to the core network responsive to the packet discard rate exceeding a discard rate threshold.

6. The eNB of claim 1, wherein the congestion period is measured on a per-bearer basis.

7. The eNB of claim 1, wherein the sub-QCI packet dropping processing circuitry is further configured to receive a second message from the UE updating sub-QCI information.

8. The eNB of claim 1, wherein the first message comprises at least one of:
   Internet Protocol (IP) flow classification information;
   the sub-QCI packet dropping delay threshold; and
   an intra-flow classification parameter.

9. The eNB of claim 1, wherein the first message comprises a plurality of sub-QCI for the QCI and for each of the plurality of sub-QCI, the first message comprises at least one of:
   Internet Protocol (IP) flow classification information;
   the sub-QCI packet dropping delay threshold for the sub-QCI; and
   an intra-flow classification parameter.

10. The eNB of claim 9, wherein the plurality of sub-QCI are prioritized and wherein the delay threshold for a higher priority sub-QCI is longer than the delay threshold for a lower priority sub-QCI.

11. An enhanced node B (eNB) comprising:
   a processor coupled to a memory
   having instructions stored thereon, which when executed cause the processor to:
      identify a Quality of Service Class Identifier (QCI) delay for each of a plurality of downlink packets;
      establish a window defining a length of time within which downlink packets will be examined;
      determine whether the QCI delay for each of the plurality of downlink packets exceeds a delay threshold;
      determine a start of a congestion period responsive to a number of consecutive downlink packets that do not exceed the delay threshold reaching a first count threshold followed by a downlink packet that does exceed the delay threshold;
      determine an end of the congestion period responsive to a number of consecutive downlink packets that do not exceed the delay threshold reaching a second count threshold;
      determine a length of the congestion period;
      retrieve a second length threshold;
      send a congestion indication message to a core network responsive to the length of the congestion period exceeds a first length threshold; and
      send the congestion indication message to the core network responsive to the length of the congestion period exceeding the second length threshold within the window.

12. The eNB of claim 11, wherein the first count threshold is the same as the second count threshold.

13. The eNB of claim 11, wherein each packet is assigned a time stamp when de-queued from a Radio Link Control layer of the eNB and wherein the length of the congestion period is calculated by subtracting the time stamp on a last packet of the congestion period from the time stamp a first packet of the congestion period.

14. The eNB of claim 11, wherein the instructions further cause the processor to:
    calculate a packet discard rate within the window;
    send the congestion indication message to the core network responsive to the packet discard rate exceeding a discard rate threshold.

* * * * *